(12) United States Patent
Radou et al.

(10) Patent No.: US 12,311,372 B2
(45) Date of Patent: May 27, 2025

(54) DEFORMABLE DEVICE FOR POSITIONING A HOLDER

(71) Applicants: Paris Sciences et Lettres, Paris (FR); Centre National de la Recherche Scientifique (CNRS), Paris (FR); Sorbonne Universite, Paris (FR); UNIVERSITÉ PARIS CITÉ, Paris (FR)

(72) Inventors: Gaël Radou, Cergy-le-Haut (FR); Thibault Vieille, Rocquencourt (FR); Vincent Croquette, Antony (FR)

(73) Assignees: Paris Sciences et Lettres (FR); Centre National de la Recherche Scientifique (CNRS) (FR); Sorbonne Universite (FR); UNIVERSITÉ PARIS CITÉ (FR)

( * ) Notice: Subject to any disclaimer, the term of this patent is extended or adjusted under 35 U.S.C. 154(b) by 807 days.

(21) Appl. No.: 17/596,986

(22) PCT Filed: Jun. 26, 2020

(86) PCT No.: PCT/EP2020/068132
§ 371 (c)(1),
(2) Date: Dec. 22, 2021

(87) PCT Pub. No.: WO2020/260655
PCT Pub. Date: Dec. 30, 2020

(65) Prior Publication Data
US 2022/0266249 A1    Aug. 25, 2022

(30) Foreign Application Priority Data
Jun. 26, 2019   (EP) .................................... 19305859

(51) Int. Cl.
*B01L 3/00* (2006.01)
*B01L 9/00* (2006.01)
(Continued)

(52) U.S. Cl.
CPC ... *B01L 3/502761* (2013.01); *B01L 3/502715* (2013.01); *B01L 9/527* (2013.01);
(Continued)

(58) Field of Classification Search
None
See application file for complete search history.

(56) References Cited

U.S. PATENT DOCUMENTS 7,072,105 B2 * 7/2006 Delaage ................. G02B 21/26
108/138
7,678,337 B2 * 3/2010 Sage ......................... B01L 9/52
422/510

(Continued)

FOREIGN PATENT DOCUMENTS

CN   203414667 U   1/2014
DE   40 41 870 A1   7/1992

(Continued)

OTHER PUBLICATIONS

Ding, F. et al., "Single-molecule mechanical identification and sequencing", Nature Methods, Mar. 2012, pp. 1-24.

*Primary Examiner* — Elizabeth A Robinson
*Assistant Examiner* — Brittany I Fisher
(74) *Attorney, Agent, or Firm* — Lerner David LLP (57) ABSTRACT

A device positioning an object according to a given direction, including a frame, a holder for holding the object, the holder being movable relative to the frame according to the given direction, a main lever extending between a first point and a second point, said main lever being rotatably mounted to the frame via a first pivot link connecting the main lever (Continued)

and the frame at the first point of the main lever, the main lever being connected to the holder at a third point which is arranged between the first point and the second point, so that a displacement of the second point of the main lever relative to the frame according to the given direction causes displacement of the holder in said given direction.

19 Claims, 9 Drawing Sheets

(51) Int. Cl.
  *G01B 7/30* (2006.01)
  *G01B 9/00* (2006.01)
  *G01D 5/14* (2006.01)
  *G02B 7/00* (2021.01)
  *G02B 21/02* (2006.01)
  *G02B 21/26* (2006.01)
(52) U.S. Cl.
  CPC ............ *G01B 7/30* (2013.01); *G01D 5/145* (2013.01); *G02B 21/02* (2013.01); *G02B 21/26* (2013.01); *B01L 2200/025* (2013.01); *B01L 2200/0647* (2013.01); *B01L 2300/0654* (2013.01)

(56) References Cited

U.S. PATENT DOCUMENTS

| | | | |
|---|---|---|---|
| 8,537,462 B2* | 9/2013 | Seifert | G02B 21/26 359/393 |
| 2007/0195435 A1* | 8/2007 | Theriault | G02B 7/004 359/819 |
| 2011/0069492 A1 | 3/2011 | van den Engh | |
| 2011/0090563 A1* | 4/2011 | Krasov | G02B 21/0036 359/391 |
| 2014/0240824 A1* | 8/2014 | Taylor | G02B 21/34 414/744.3 |
| 2014/0327961 A1 | 11/2014 | Fahlbusch et al. | |
| 2015/0226662 A1* | 8/2015 | Hirono | G01N 21/13 359/391 |

FOREIGN PATENT DOCUMENTS

| | | |
|---|---|---|
| EP | 3181703 A1 | 6/2017 |
| EP | 3 428 708 A1 | 1/2019 |
| JP | 2008096931 A | 4/2008 |

* cited by examiner

DEFORMABLE DEVICE FOR POSITIONING A HOLDER

TECHNICAL FIELD

The present invention relates to a device for measuring the position of one or several objects, such as a microbead. This device finds particular application for actuating with precision the focusing position of a microscope objective.

BACKGROUND OF THE INVENTION

In order to study interactions between DNA molecules and other components, such as proteins, it is known to submit the DNA molecules to stretching forces and to measure the elastic properties (i.e. relative extension versus force characteristics) of the molecules.

Document EP 3181703 A1 discloses for instance an optical device for measuring the position of an object along a given direction, comprising an optical imaging system. In this device, a transmission mask allows selecting two radiation parts from light radiations diffused by the object to be measured so as to generate two spots in the image recorded by the detector. As the distance between the two spots along a second direction, transverse to the given direction, is proportional to the distance between the bead and the object plane of the imaging system, it is possible to infer, from the image, the position of the bead according to the given direction.

In such an optical device, the optical imaging system comprises a microscope objective. The microscope objective is supported by a holder. The position of the holder in the given direction is actuated by a piezoelectric device. The piezoelectric device has the advantage to actuate the holder with a fast response time after receiving a control voltage.

However, the price of such a piezoelectric device is extremely high.

In addition, the piezoelectric device needs a continuous control of an applied voltage to maintain its position. The associated voltage feedback can introduce a mechanical noise, hindering the measurement of the position of the bead in the given direction. It is known to reduce this mechanical noise with the help of an expensive high quality electronic feedback, but this noise cannot be entirely eliminated.

SUMMARY OF THE INVENTION

A device has been developed to respond to the above-mentioned issues of the prior art. The device, adapted for positioning an object according to a given direction, comprises:
a frame,
a holder for holding the object, the holder being movable relative to the frame according to the given direction,
a main lever extending from a first point to a second point, said main lever being rotatably mounted to the frame via a first pivot link connecting the main lever and the frame at the first point of the main lever, the main lever being connected to the holder at a third point via a second pivot link, the third point being arranged between the first point and the second point, so that a displacement of the second point of the main lever relative to the frame according to the given direction causes displacement of the holder in said direction, said displacement of the holder having a smaller amplitude than an amplitude of the displacement of the second point
the device comprising a secondary lever connected to the holder via a third pivot link, the secondary lever being connected to the main lever via a fourth pivot link, and being rotatably mounted to the frame via a fifth pivot link, the third pivot link being arranged between the fourth pivot link and the fifth pivot link.

In further optional aspects of the invention:
the device comprises another main lever, the two main levers being arranged on two opposite sides of the holder, so that the other main lever extends from another first point of said other main lever to another second point of said other main lever, said other main lever being rotatably mounted to the frame via another first pivot link connecting the other main lever and the frame at the other first point, the other main lever being connected to the holder at another third point of said other main lever which is arranged between the other first point and the other second point, so that a displacement of the other second point relative to the frame according to the given direction causes displacement of the holder in said direction, said displacement of the holder having a smaller amplitude than an amplitude of the displacement of the other second point
each main lever is arranged symmetrically on either side of the holder,
the first pivot link and/or the second pivot link is(are) a torsion spring(s),
the device is made of one single piece of material, the material being notably chosen between a metal and a polymer, and preferably a material having an ultimate tensile strength over 100 MPa,
the first pivot link and/or the second pivot link is(are) a narrowing of the material relative to the main lever,
the device comprises another secondary lever, the secondary lever being arranged on two opposite sides of the holder, so that the other secondary lever is connected to the holder via another third pivot link, the other secondary lever being connected to the main lever via another fourth pivot link, and being rotatably mounted to the frame via another fifth pivot link, the other third pivot link being arranged between the other fourth pivot link and the other fifth pivot link, the secondary levers being arranged symmetrically on either side of the holder,
the device comprises a movable part connected to the main lever(s) at the second point, the movable part being adapted to be displaced in the given direction by an actuator.

Another aspect of the invention is an assembly comprising the device, and further comprising an actuator configured for moving each second point at least in said given direction.

In further optional aspects of the invention:
the actuator is a motorized screw having a tip, the tip being arranged in contact with the movable part so that the actuation of the screw leads to a displacement of the second point(s) in the given direction,
the actuator comprises a first part fixed to the frame and a second part, the second part being mobile relative to the first part, and wherein the device further comprises a magnet attached to the second part, and a magnetic field sensor adapted to detect the variation of the magnetic field caused by a movement of the second part.

Another aspect of the invention is a system comprising the device or the assembly, and a microscope objective, the objective being held by the holder of the device.

Another aspect of the invention is the use of the device, the assembly and/or the system to focus an optical objective.

Another aspect of the invention is the use of the device for moving micromirrors.

Another aspect of the invention is the use of the device for aligning optical fiber.

BRIEF DESCRIPTION OF THE DRAWINGS

The invention will be described by way of example, with reference to the accompanying drawings in which.

DETAILED DESCRIPTION OF PREFERRED ASPECTS OF THE INVENTION

Basic Principles

Figure 1:
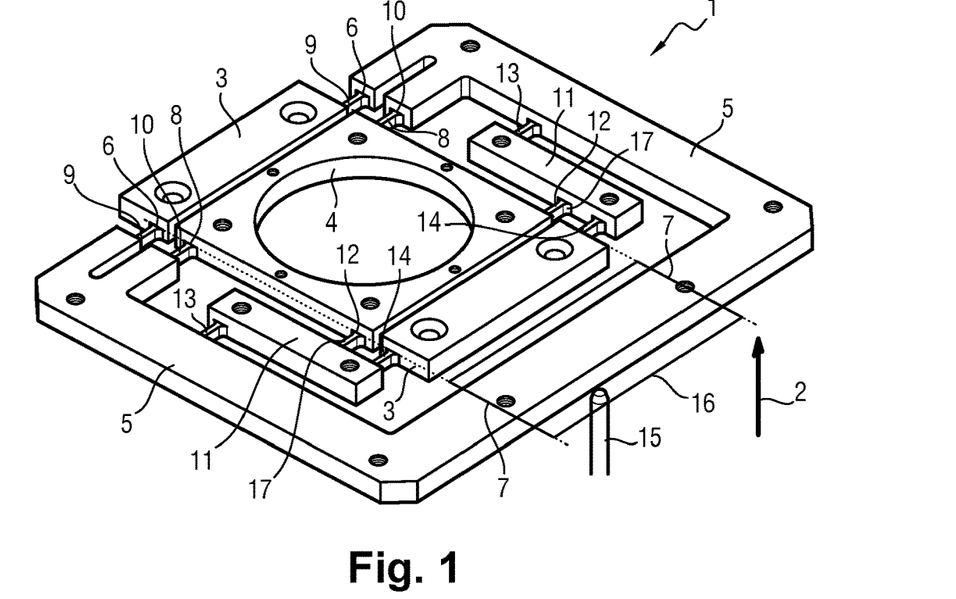
FIG. 1 diagrammatically shows a device according to a possible embodiment of the invention, FIG. 2 diagrammatically shows a top view of the device, FIG. 3 diagrammatically shows a side view of the device, FIG. 4 diagrammatically shows the torsion of a torsion spring of a device according to a possible embodiment of the invention, FIG. 5 diagrammatically shows a system according to a possible embodiment of the invention, FIG. 6 diagrammatically shows a side view of a system according to a possible embodiment of the invention.
Figure 2:
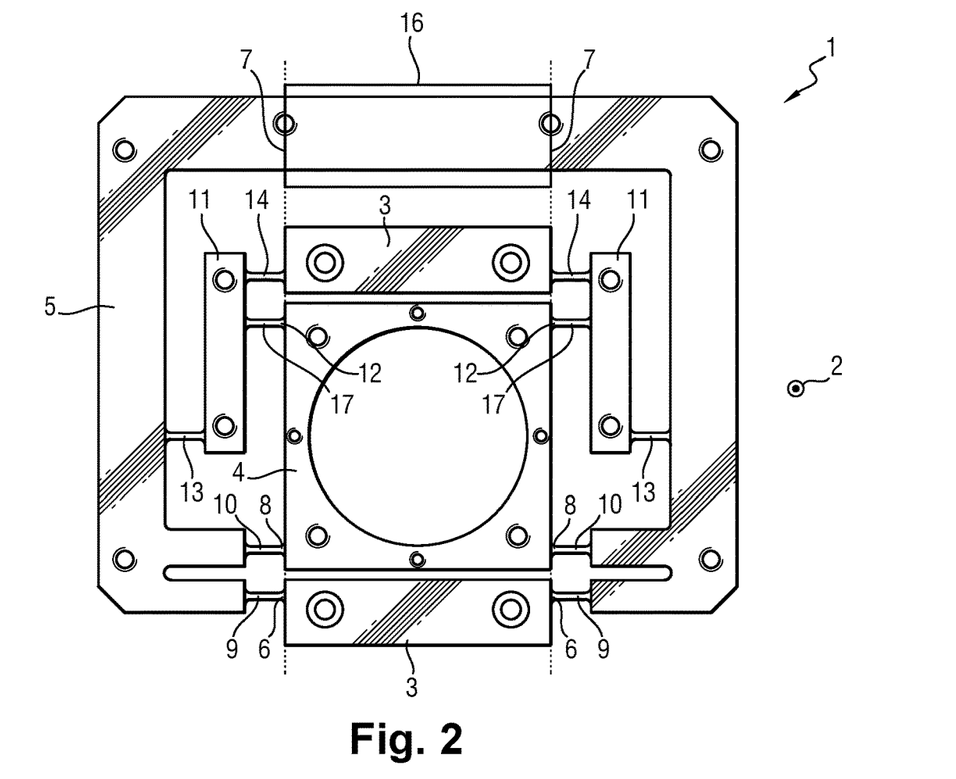
Figure 3:
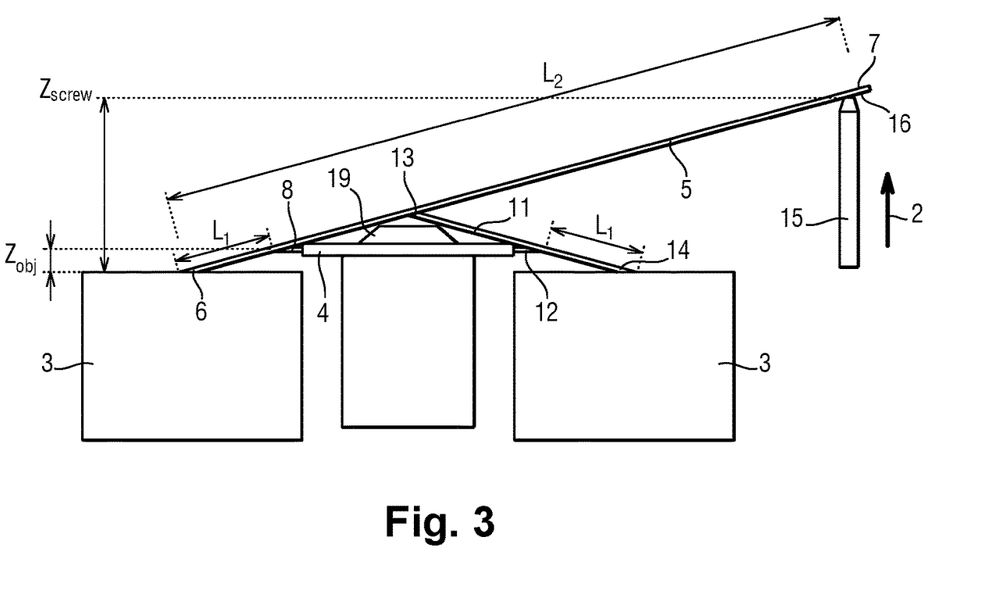

In reference with FIG. 1, FIG. 2 and FIG. 3, the device 1 is adapted for positioning an object according to the given direction 2. The device 1 comprises a frame 3, preferably configured for being fixed to the ground. The device 1 also comprises a holder 4. The holder 4 can hold any object destinated to be actuated with precision by the device 1. Preferably, the holder 4 is configured for holding an optical equipment. The optical equipment is preferably a microscope objective 19. The frame 3 and the holder 4 are configured such that the holder 4 is movable in the given direction 2.

The device 1 comprises a main lever 5. The main lever 5 is at least extending from a first point 6 of the main lever 5 to a second point 7 of the main lever 5. The main lever 5 is rotatably mounted to the frame 3 via the first pivot link 9. The first pivot link 9 is connecting the main lever 5 and the frame 3 at the first point 6 of the main lever 5.

The main lever 5 is mechanically connected to the holder 4 at the third point 8. Preferably, the main lever 5 is rotatably connected to the holder 4 at the third point 8. The third point 8 is arranged between the first point 6 and the second point 7. Therefore, the displacement of the second point 7 of the main lever 5 with a given amplitude relative to the frame 3 and according to the given direction 2 causes the displacement of the holder 4 with a smaller amplitude. The main lever 5 is preferably connected to the holder 4 at the third point 8 via a second pivot link 10 of said main lever 5. Therefore, a translation of the holder 4 can occur when actuating the main lever 5.

Given a distance between the first point 6 and the third point 8 equal to $L_1$, and a distance between the first point 6 and the second point 7 equal to $L_2$, the mechanical reduction ratio of the device 1 is given by the ratio $r=L_1/L_2$.

The device 1 preferably comprises a movable part 16. The movable part 16 is connected to the main lever 5 at the second point 7. The movable part 16 is adapted to be displaced in the given direction 2, so as to actuate the second point 7 and the main lever 5. When the device 1 comprises several main levers 5, for example two symmetrical main levers 5, the movable part 16 can be connected to each of the main levers 5, so that when the movable part 16 is actuated, each second point 7 of each main lever 16 is actuated. The movable part 16 can be mounted fixed to the main lever(s) 5. The frame 3, the holder 4,the main lever(s) 5, and preferably the movable part 16 can form a monolithic body, as illustrated in FIG. 1 and in FIG. 2.

Secondary Lever(s) 11

The device 1 preferably comprises at least a secondary lever 11, associated with a main lever 5. The secondary lever 11 is connected to the holder 4 via a third pivot link 12. the secondary lever 11 is also connected to the main lever 5 via a fourth pivot link 13, and is rotatably mounted to the frame 3 via a fifth pivot link 14. The third pivot link 12 is arranged between the fourth pivot link 13 and the fifth pivot link 14. Therefore, it is possible to avoid or to minimize movements of the holder 4 along a line passing by the third point 8 and by the third pivot link 12. Indeed, the force components applied on the holder 4 which are transverse to the given direction 2 cancel themselves. The secondary lever 11 makes possible to avoid transverse motion of the holder 4 and/or to avoid tipping of the holder 4 during a movement of the holder 4 relative to the given direction 2.

The fourth pivot link 13 is preferably arranged in the center of the holder 4 when projected on the line passing by the third point 8 and by the third pivot link 12, preferably at equal distance from the third point 8 and from the third pivot link 12. Therefore, the moment applied to the second pivot link 10 and to the fifth pivot link 14 can be equal.

Symmetry

The device 1 preferably comprises two main levers 5 arranged on two opposite sides of the holder 4. Therefore, it is possible to avoid transverse motion of the main lever 5 and of the holder 4 when the device 1 is actuated. It also makes possible to avoid the tipping of the holder 4 when it is actuated.

Each main lever 5 is preferably arranged symmetrically on either side of the holder 4, relative to the holder 4, and notably, to the center of the holder 4. Therefore, it is possible to counterbalance potential transverse forces induced by one main lever 5, and then to avoid transverse motion of the holder 4.

The device 1 preferably comprise two secondary levers 11, each secondary lever 11 being associated with a main lever 5. The two secondary levers 11 are arranged on two opposite sides of the holder 4, and are symmetrical on either side of the holder 4. Therefore, it is possible to avoid any transverse motion of the holder 4 relative to the given direction 2 when the main lever 5 is actuated.

Pivot Links

At least a pivot link of the device 1 (preferably the first pivot link 9, the second pivot link 10, the third pivot link 12, the fourth pivot link 13, the fifth pivot link 14 and/or the pivot link connecting the main lever 5 to the movable part 16) can be a torsion spring. Therefore, the fabrication of the device 1 is simplified. Another effect of using torsion springs is to simplify the actuation of the device: a displacement of the holder 4 relative to the given direction 2 occurs with an actuation of the main lever 5 relative to the given direction 2, and a displacement of the holder 4 in a direction opposite to the given direction occurs when holding back an actuator due to the counter action of each torsion spring.

Preferably, the torsion springs of the first pivot link 9 and of the fifth pivot link 14 have an equal torsion coefficient. Preferably, the torsion springs of the second pivot link 10 and the third pivot link 12 have an equal torsion coefficient. Notably, all the torsion springs have an equal torsion coefficient.

Figure 4:
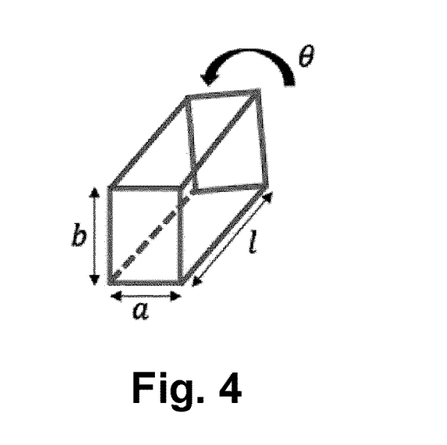

Referring to FIG. 4, the torsion spring is preferably a piece of material, adapted to connect two elements. The torsion spring can be a rectangular cuboid connected to another element at each of its extremities. The torsion coefficient of such a torsion spring is determined by the choice of the material of the torsion spring, its width a, its height b and its length 1.

The device 1 is preferably monolithic, i.e. made of one single piece of material, comprising the frame 3, the holder 4, the main lever 5 and the torsion springs, and notably the secondary lever 11 and the movable part 16. Therefore, the different elements can be symmetrical and have the exact same mechanical property, thus avoiding any tipping and transverse motion relative to the direction 2 of the holder 4 when actuated.

The device 1, when made of one single piece of material, can be fabricated by additive printing or 3D printing. Preferably, the first pivot link 9 and/or the second pivot link 10 is(are) a narrowing of the material relative to the main lever 5. The material of the device 1 can be chosen between a metal and a polymer, and preferably a metal. Therefore, the heat conduction properties of the metal help optimizing the thermalization of the holder. The material has preferably a tensile strength over 100 MPa, notably over 280 MPa, which allows to extend the range of reversible elastic deformation of the motion along the direction 2. The material can be for example aluminium, and preferably aluminium 7075.

The device 1 can also be fabricated by conventional machining, micromachining, lift-off, and photolithographic techniques, so that to fabricate a device 1 can be miniaturized, having micrometric dimensions. For example, the thickness of the main lever 5 can be less than 10 µm. The maximum length of the device 1 can be less than 100 µm and the adjustable range of position along the direction 2 can be less than 10 µm.

Dynamic Range

For a translation of the holder 4 over the length dz relative to the given direction 2, the second point 7 (and preferably the movable part 16) has to be translated by the length z=r.dz. The maximum torsion occurs at the fourth pivot link 13 and is expressed by: $\theta = (2.z)/L_2$, $\theta$ being the torsion of the torsion spring, defined by the angle difference of one extremity of the spring relative to the other, relative to the state when the device 1 is not actuated (i.e. $\theta=0$).

The infinitesimal angle of torsion (torsion per unit of length) is given by:

$$\delta\theta = \frac{\theta}{l} = \frac{2z}{l \cdot L_2} \quad (1)$$

To maintain a reversible deformation of the torsion spring, one needs to ensure that the maximum local constraint induced by the torsion does not exceed the limit of elasticity of the material. Calling $\tau_M$ the maximum local constraint, which is the shear constraint on the top and bottom points of the torsion spring, one can write:

$$\tau_M = G \cdot \delta\theta \cdot \frac{b}{2} < \frac{R_{el}}{2} \quad (2)$$

where G is the transverse elastic modulus of the material, given by the formula G=0.4 E in the case of metal material, E being the Young modulus of the material, and $R_{el}$ being the limit of elastic deformation of the material. These formulas lead to a design a criterion to limit the elastic deformation to the maximum extension of the actuator:

$$0.4 \cdot E \cdot \frac{z \cdot b}{l \cdot L_2} < \frac{R_{el}}{2} \quad (3)$$

The values of E and $R_{el}$ can be adapted to optimize the focal dynamic range. Aluminium-based alloys can be chosen for fabricating the device 1 because of their high thermal conductivity. Among these alloys, aluminium 7075 is the one that offers the best compromise, with a value of E=71 GPa, and $R_{el}$=470 MPa. This alloy is the one that provides the highest level of elastic (reversible) deformation.

It is desirable that the device 1 provides a sufficient translation range in the given direction 2 of the holder 4, allowing adaptation to different microscope objectives (e.g. with different working distances). The translation range can be chosen for example over 200 µm, when considering the main lever 5 is only pushed. Preferably, the range can be doubled when pushing and pulling the main lever 5 at the second point and/or at the movable part 16.

Table 1 is an example of the different parameters fitting with the above-mentioned requirements.

TABLE 1

| material | Aluminium 7075 |
| --- | --- |
| mechanical reduction ratio r | 10 |
| length $L_2$ of the main lever 5 | 70 mm |

TABLE 1-continued

| material | Aluminium 7075 |
|---|---|
| length l of the torsion spring | 6 mm |
| height b of the torsion spring | 2 mm |
| height of the main lever | 2 mm |

The range of the second point 7 (or movable part 16) displacement is then approximately given by $z_M=2$ mm, wich corresponds to roughly 200 μm of focusing adjustment in one direction (400 μm if we use the two direction of deformation, relative to the given direction 2 and the opposite direction).

Actuator 15

An assembly for measuring the position of an object according to a given direction 2 comprises the device 1 and an actuator 15 configured for moving the main lever 5 at the second point 7 and/or the movable part 16, at least in said given direction 2.

Architecture of the Actuator 15

Figure 5:
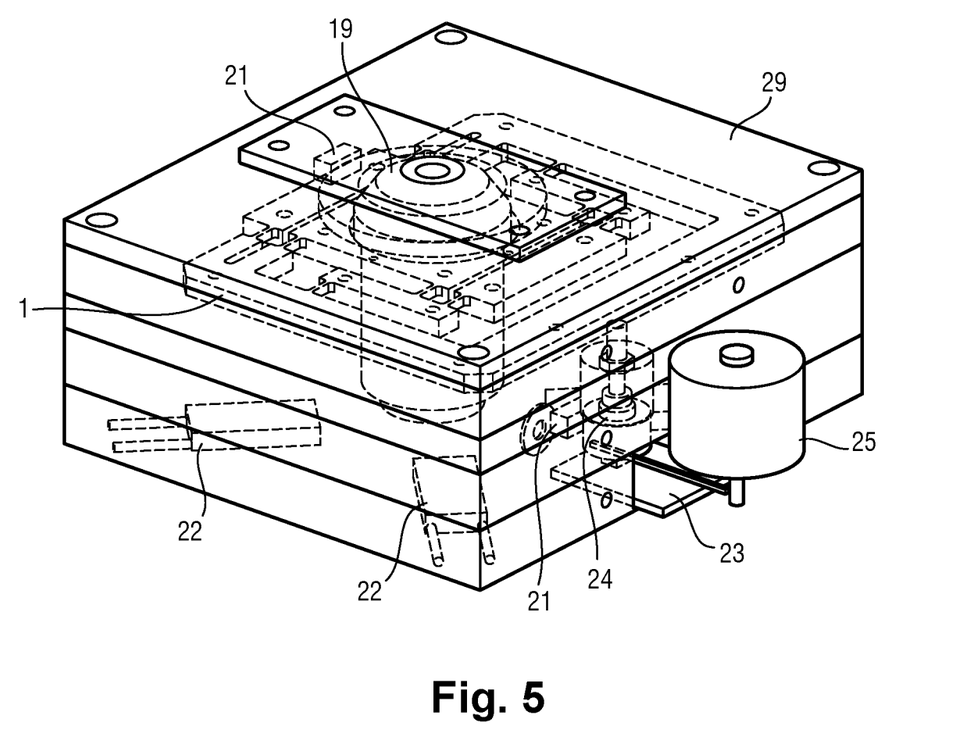
Figure 6:
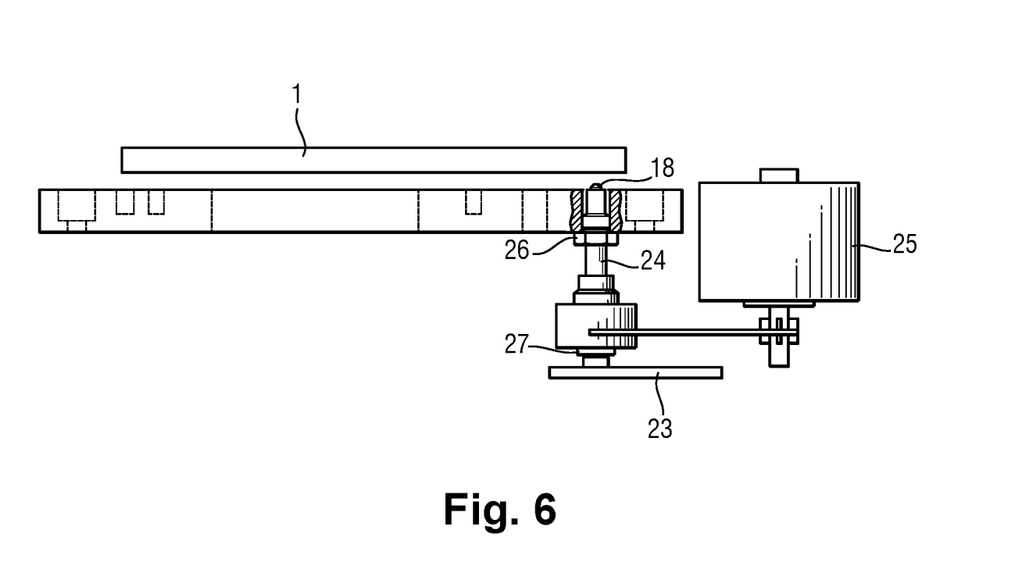

In reference to FIG. 5 and FIG. 6, the actuator 15 preferably comprises a micrometric screw 24. The screw 24 has a tip 18 which is adapted to be in contact with the main lever 5 and/or the movable part 16 of the device 1, so that a force can be applied on the device 1 according to the given direction 2, leading to a displacement of the second point(s) in the given direction 2.

The screw 24 is driven in rotation by a motor 25, for example a DC motor. The rotation angle of the screw 24, can be converted into a position. The pitch of the lead screw 24 is for example 250 μm. As for any type of screw, the leadscrew can present some periodic non-linearity of the thread. This can result in an absolute accuracy of 1.5 μm relative to the given direction 2 when measuring the position of the actuator 15.

The position of the tip 18 of the actuator 15 can be measured with an external sensor 20. The external sensor 20 can be uncoupled with the rotation angle of the screw 24. The external sensor 20 is then preferably a linear magnetic and/or optical encoder, arranged at the contact point between the device 1 and the actuator 15, or at a point representative of the position of the contact point between the device 1 and the actuator 15 according to the given direction 2.

Figure 7:
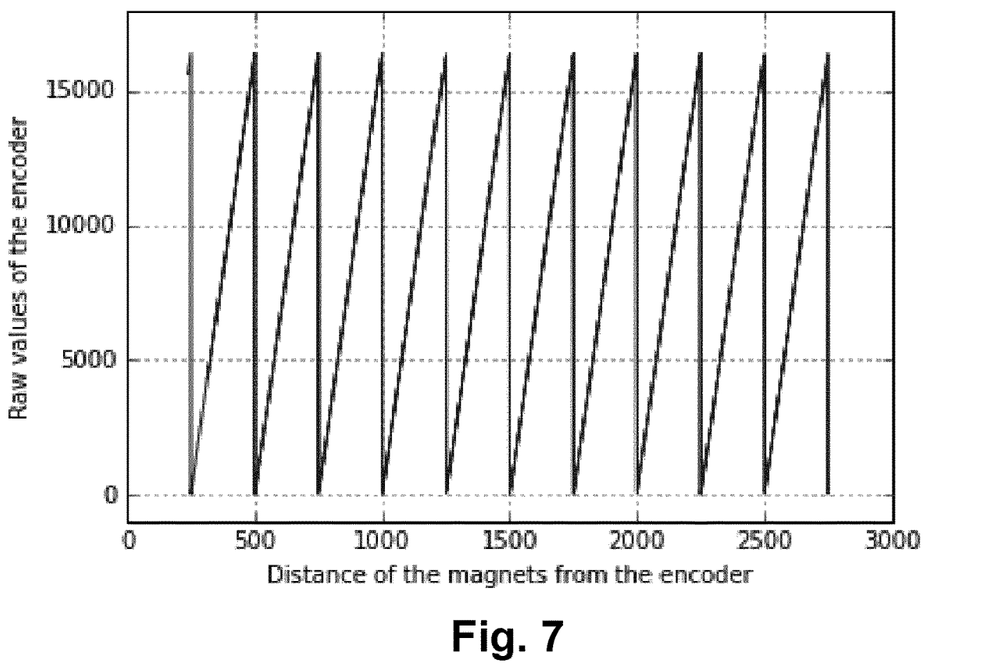
FIG. 7 illustrates the output of an encoder of a device according to a possible embodiment of the invention.

The external sensor 20 is preferably the rotary encoder 23. The rotary encoder 23 can measure a quadrature signal coming from the periodic variation of the vertical component of the magnetic field generated by the two poles of a suitable magnet(s) 27 attached to the micrometric screw 24. This vertical component is measured continuously by an array of Hall sensors embedded on the rotary encoder 23, which delivers two signals in quadrature that are processed by the DSP (digital signal processor) of the encoder 23. This output quadrature signal gives a very accurate signal proportional to the angle position of the magnet within one complete rotation (360°) of the magnets. In reference with FIG. 7, a 14-bit encoder 23 encodes one rotation (0-360°) of the magnet over 16384 values. As the micrometric screw is turned, the angle of the magnets as well as the distance of the magnets from the chip increases, which gives a periodic raw value for the angular range 0-360°.

However, it is not possible to distinguish the number of complete rotations from the origin (contact point of the magnets with the chip surface) with the quadrature signal. Then, the rotary encoder 23 can also measure the absolute amplitude of the magnetic field from the magnet 27. The magnetic field strength diminishes when the magnets move away from detectors of the encoder 23. This measurement is less sensitive but provides an absolute coarse signal from which can determine the number of complete rotations from the origin performed by the motor 25. An analog gain signal from a Programmable Gain Amplifier (PGA) can be continuously adapted by the rotary encoder 23, to amplify the detection of the magnetic signal and maintain an approximately constant signal level for the computation of the quadrature signal. Subsequently, the rotary encoder 23 delivers not a direct measurement of the absolute amplitude of the magnetic field, but rather, in addition to the quadrature signal, two other signals.

Figure 8:
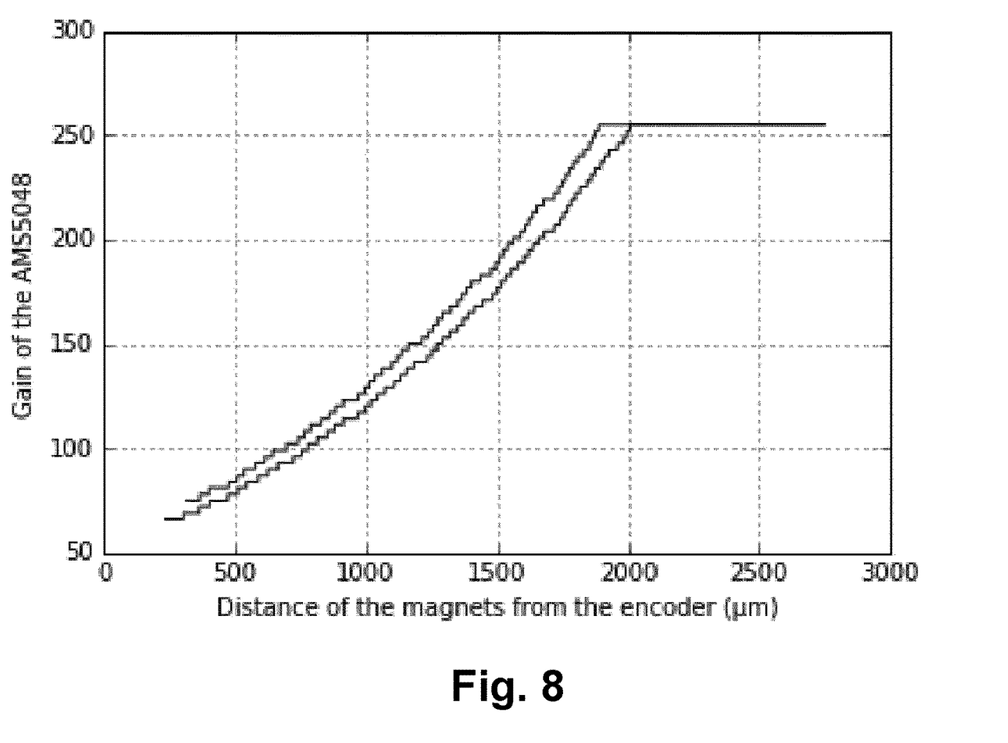
FIG. 8 illustrates the gain of a programmable gain amplifier of an assembly according to a possible embodiment of the invention.

In reference with FIG. 8, one of those two signals is the analog gain (PGA), which is a 8-bit integer. As the screw 24 is turned up and down over 3 mm, the gain increases/decreases with the distance to compensate the decrease of the magnetic field, and then reaches its maximum value at roughly 2 mm from the surface of the chip. The gain is then a monotonic function of the distance over 250 μm to 2 mm from the distance.

Figure 9:
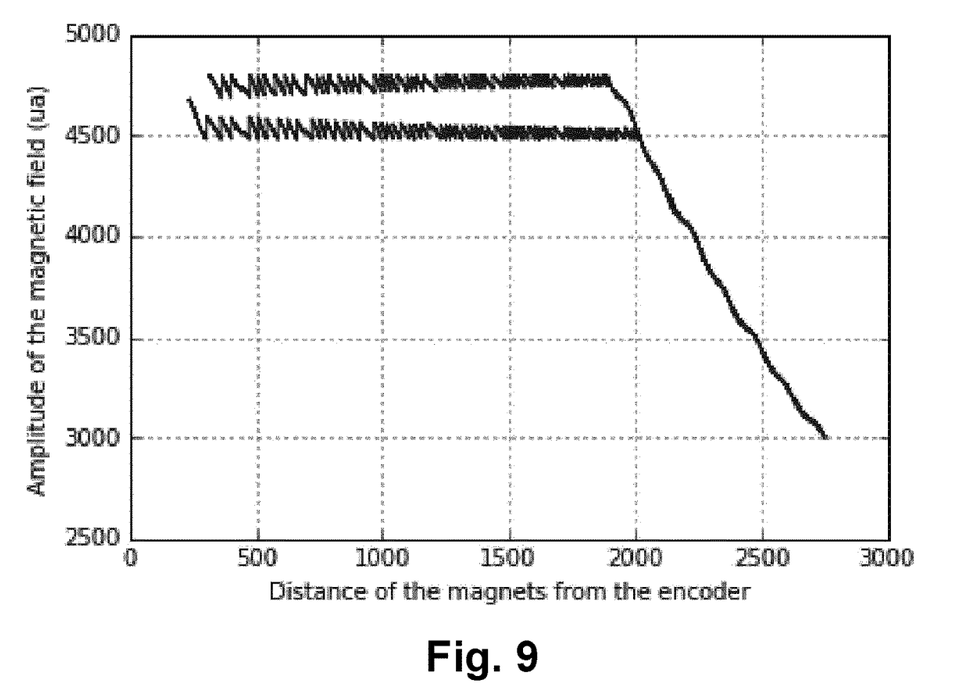
FIG. 9 illustrates the amplitude of the magnetic field of magnets from a magnetic sensor of a device according to a possible embodiment of the invention, FIG. 10 illustrate a ratio of the amplitude over the gain for different distances of magnets from an magnetic sensor of a device according to a possible embodiment of the invention.

In reference with FIG. 9, the other of the two signals is the amplitude of the magnetic field, after amplification by the PGA. Between 0 to 2 mm, the magnitude is constant, due to the compensation of the gain. After 2 mm, the gain is saturated and does not compensate for the decrease of the magnetic field with the distance. At this point the magnitude decreases with the distance from the surface, which provides a monotonic signal over 2 mm to roughly 2.7 mm from the surface.

The combination of the amplified amplitude and of the analog gain provides the coarse amplitude, and will be used to determine in which rotation are the magnets 27.

Figure 10:
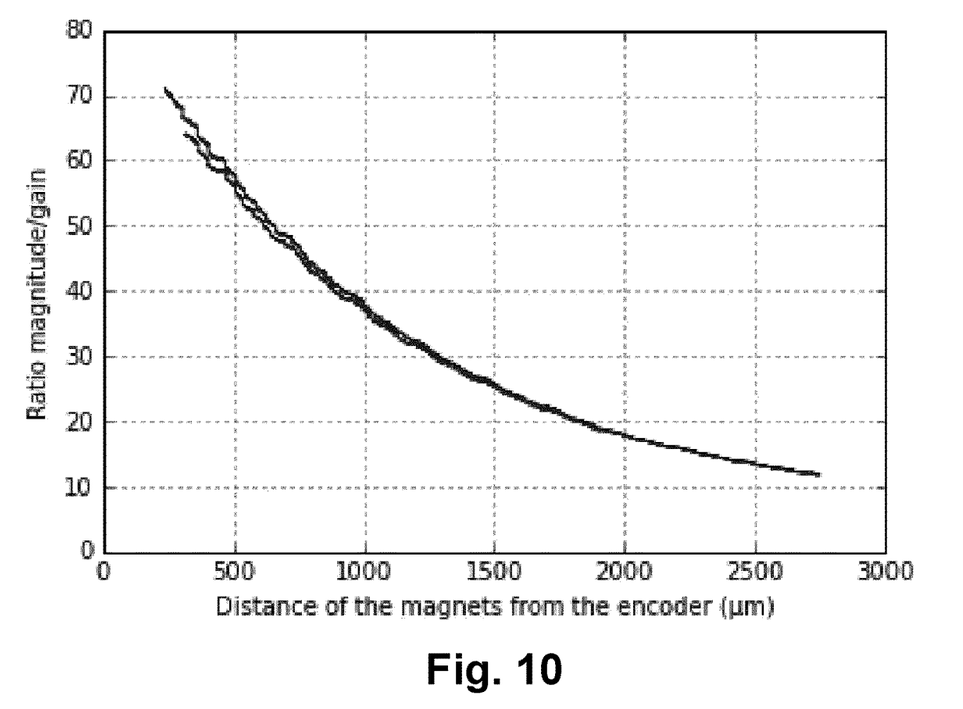

In reference with FIG. 10, the ratio of the measured amplitude over the gain provides a monotonic signal for a distance between the encoder 23 and the magnets 27 comprised between 250 μm and 2.7 mm.

Figure 11:
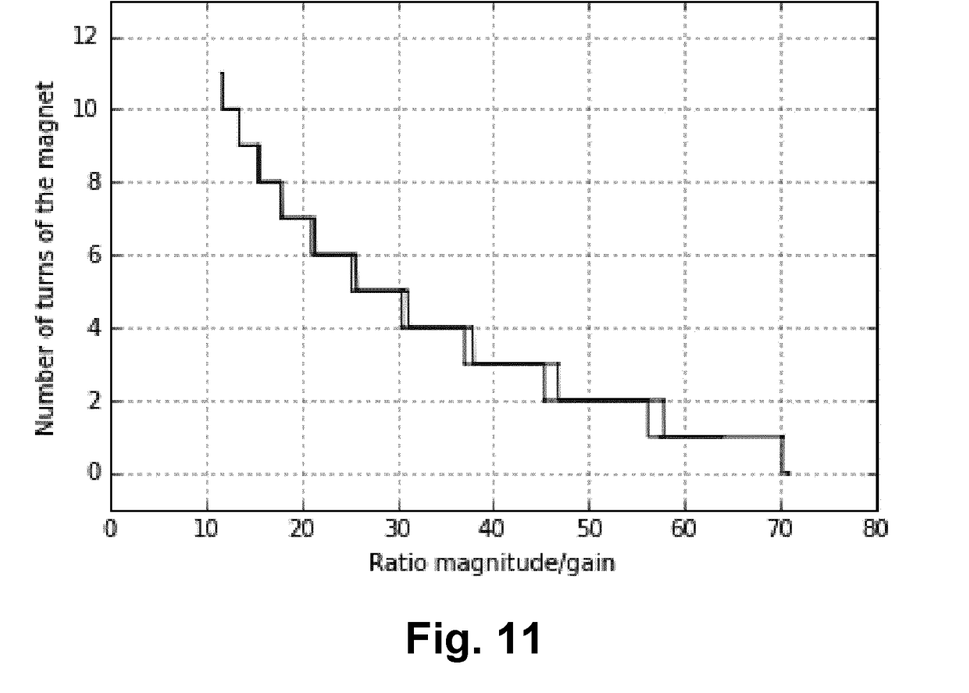
FIG. 11 illustrates the number of turns of the magnet for different values of the ratio of the amplitude over the gain, FIG. 12 diagrammatically illustrate a hardware configuration of a system according to a possible embodiment of the invention.

In reference with FIG. 11, it is possible to calculate the number of turns of the magnet from the ratio of the measured amplitude over the gain.

The rotary encoder 23 is interfaced with the microcontroller using a SPI communication protocol. A calibration step is performed. This calibration comprises a step of recording the gain and the amplitude during a complete back and forth motion of the screw 24 across 3 mm. This provides a reference table of the gain and the amplitude, to find the correct number of turns.

Thermalisation

A variation of the temperature of the system involves a dilatation of the materials of the various components, thus changing the distance between the microscope objective 19 and the object to be observed.

In reference with FIG. 5, the different components of the system, comprising preferably the device 1, the actuator 15 and the microscope objective 19, can be arranged in a thermalized box 29.

The thermalized box 29 comprises at least a thermistor 21, for measuring the temperature in the thermalized box and at least a thermal controller, for example a Pelletier element 22. Those elements can be connected to a microcontroller for maintaining the temperature in the thermalized box 29.

Hardware Control

Figure 12:
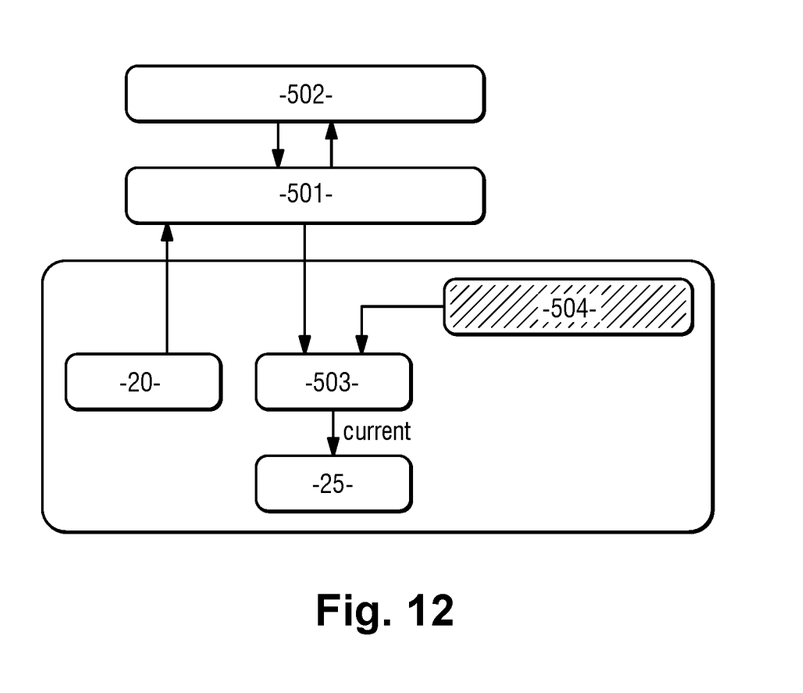

In reference with FIG. 12, the control of the position of the holder 4 according to the given direction 2 is preferably achieved using a microcontroller 501, a sensor 20 and a motor voltage controller 503.

The microcontroller 501 is configured for controlling a motor PID loop that compares the actual position of the actuator to the expected one and delivers a control signal (as a PWM output) to move the actuator 15. The microcontroller 501 is connected to a server 502, for example a PC.

The sensor 20, preferably the rotary encoder 23, continuously measures the position of the actuator 15 according to the given direction 2 and send it to the microcontroller 501.

A motor voltage controller 503 actuates the motion of the motor 25 with an applied control signal from the microcontroller 501. The motor voltage controller 503 is connected to a DC power supply 504.

Control of the DC Motor Intensity

The motor 25 is preferably a DC motor so as to permit continuous movement. The motor 25 is preferably controlled by intensity (or current). Therefore, the power of the motor 25 is maintained constant (and so as the torque) and the energy consumption is optimized.

A Pulse Width Modulation technique (PWM) is used to produce a slow varying control signal of the motor 25. This consists of generating a continuous high-frequency square signal, with a constant peak-to-peak voltage, whose duty cycle is proportional to the value of the signal. The PWM signal can be computed directly by the microcontroller 501. However, the PWM output of the microcontroller can only deliver a voltage between 0 and 3.3 V, which is significantly below the nominal voltage of the DC motor, equal to 12 V. In addition, a negative potential cannot be generated by the microcontroller 501. Such a negative potential is required to reverse the rotation of the DC motor.

The system can preferably comprise an intermediate electronic chip. The chip provides two H bridges, and is implemented at the output of the microcontroller 501. Each bridge takes one PWM signal input, and two ON/OFF signals to control the sign of the output voltage of said chip. The output is then the copy of the PWM input signal, except that the absolute voltage level is amplified to 12V (provided by the common external electrical power of the instrument) and that the polarity of the PWM output can also be reversed.

One of the two H bridges is configured for generating the output PWM that drives the DC motor at its nominal voltage of 12V.

When controlling a DC motor with a PWM voltage signal, it is preferable to set up a PWM frequency higher than the intensity response frequency of the motor, in order to keep a constant torque during the motion of the actuator. For example, the intensity frequency is $$f = \frac{r}{2\pi L} = 2.64 \text{ kHz}.$$

The PWM frequency of the microcontroller 501 is thus set to 50 kHz to keep an approximately constant torque.

A resistor in the circuit and a simple voltage measurement of its voltage can be added to monitor continuously the average current delivered by the H bridge. Therefore, a troubleshooting signal can be measured if needed.

Results

The mechanical stability of the holder 4 is measured using a device 1 of the invention and a piezoelectric device of the prior art for actuating the holder 4.

The measurement of the elongation of a molecule (described in the document of Ding, F., Manosas, M., Spiering, M. M., Benkovic, S. J., Bensimon, D., Allemand, J. F., Et Croquette, V., 2012, "Single-molecule mechanical identification and sequencing", Nature methods, 9(4), 367) is made among different sources of noise.

Considering the measurement of one microbead i at a time t through a microscope objective 19, the raw signal writes:

$$z_i(t) = z_{i,bead}(t) + z_{inst}(t) \quad (5)$$

where $z_{i,bead}(t)$ is the signal from the bead and $z_{inst}(t)$ is the contribution to the signal from the instrument noise (which comprises mechanical noise and thermal drift from various sources).

In the case where the bead i is a real hairpin, the raw signal writes:

$$z_i(t) = z_{i,mol}(t) + z_{i,SDi}(t) + z_{inst}(t) \quad (6)$$

where $z_{i,mol}(t)$ is the molecule signal (which contains the elongation, the Brownian fluctuation, and all molecule specific noise) and $z_{i,SDi}(t)$ is the optical noise.

For a reference fixed bead j, the signal $z_j(t)$ writes:

$$z_j(t) = 0 + z_{j,SDi}(t) + z_{inst}(t) \quad (7)$$

Then, the raw signal of one reference bead provides the value of instrument noise with the optical precision. It is then possible to cancel out the optical noise by taking the average of several reference beads. The measurement of one hairpin from the instrument noise can be corrected by computing:

$$z_{i,corr}(t) = z_i(t) - \langle z_j(t) \rangle_j \quad (8)$$

where $\langle z_j(t) \rangle_j$ is the average of all the reference beads signals. However, although this process improves greatly the quality of the signal in the presence of significant instrument noise, if one assumes an optical precision of 1 nm (i.e. $\sigma_{SDi} = 1$ nm), one would need to average the measurement of 100 reference beads to measure the value $z_{inst}(t)$ with a precision of 0.1 nnn, and then to correct the measure properly.

Reducing instrumentation noise as much as possible is then of crucial importance to improve the quality of the measurement.

In reference with FIG. 13, FIG. 14, FIG. 15 and FIG. 16, a system comprising a piezoelectric device of the prior art is used to measure the noise characteristics of beads.

Figure 13:
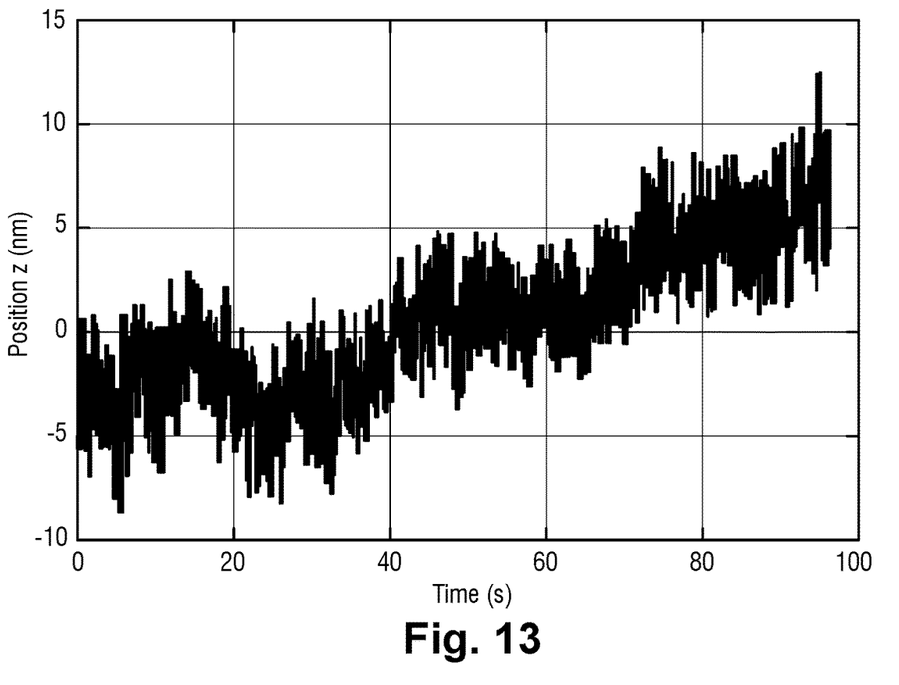
FIG. 13 illustrates the measurement of components of the position of beads according to the given direction over time with a system of the prior art.
Figure 14:
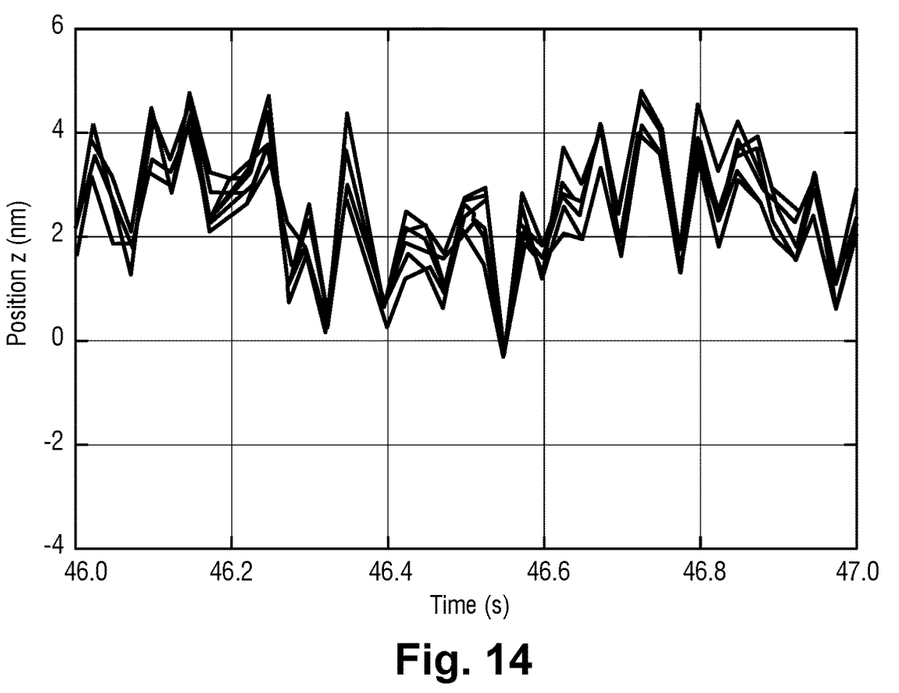
FIG. 14 illustrates a zooming view of the measurement of components of the position of beads according to the given direction over time with a system of the prior art.

Eighteen reference beads are fixed to a flow cell surface in a single field of view, over the course of several minutes, without changing the objective position. A piezoelectric device of the prior art is used to maintain the position of the holder 4. FIG. 13 illustrates the superimposed records of the fluctuation of the position z (position in the given direction 2) of the fixed beads. FIG. 14 illustrates a portion of the data illustrated in FIG. 13 on a shorter time scale.

Two distinct noise signatures can be detected. A slow variation of position from −5 nm to almost 10 nm (apparent in FIG. 13) occurs because of the thermal drift during the experiment. However, the fluctuations illustrated in FIG. 14 emphasize a high-frequency fluctuation that is common to all the 18 beads. This high-frequency mechanical noise is caused by the fast servo loop of the piezo electric device (or piezo electric focusing element, PIFOC, from PhysikInstrument).

One can isolate the fluctuation in the optical measurement of a selected bead from the other common sources of fluctuation by subtracting the average of all the other immobile beads, that is:

$$z_{i,SDi}(t) = z_i(t) - \langle z_j(t) \rangle_{j \neq i}$$

Figure 15:
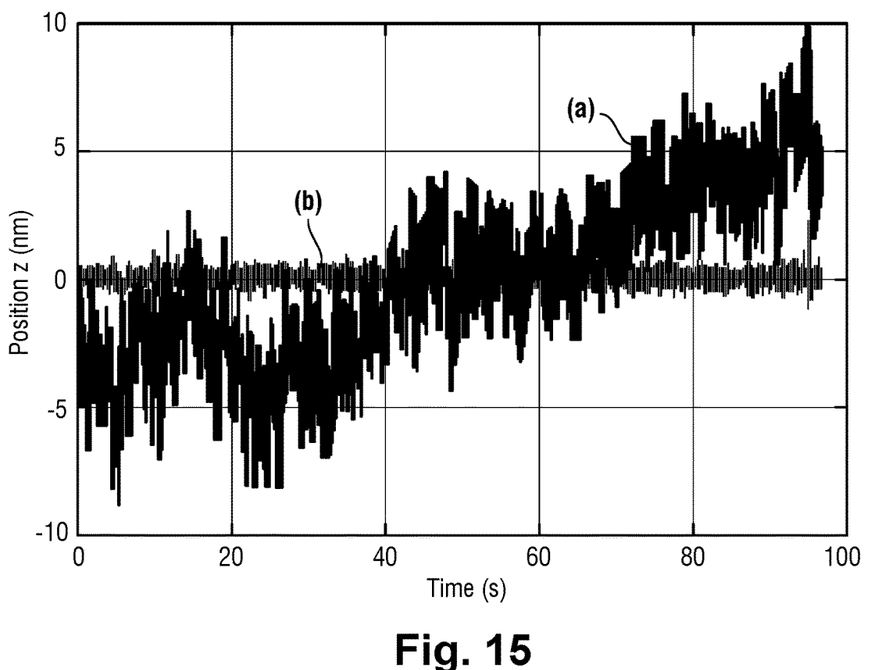
FIG. 15 illustrates the measurement of components of the position of beads according to the given direction over time with a system of the prior art.
Figure 16:
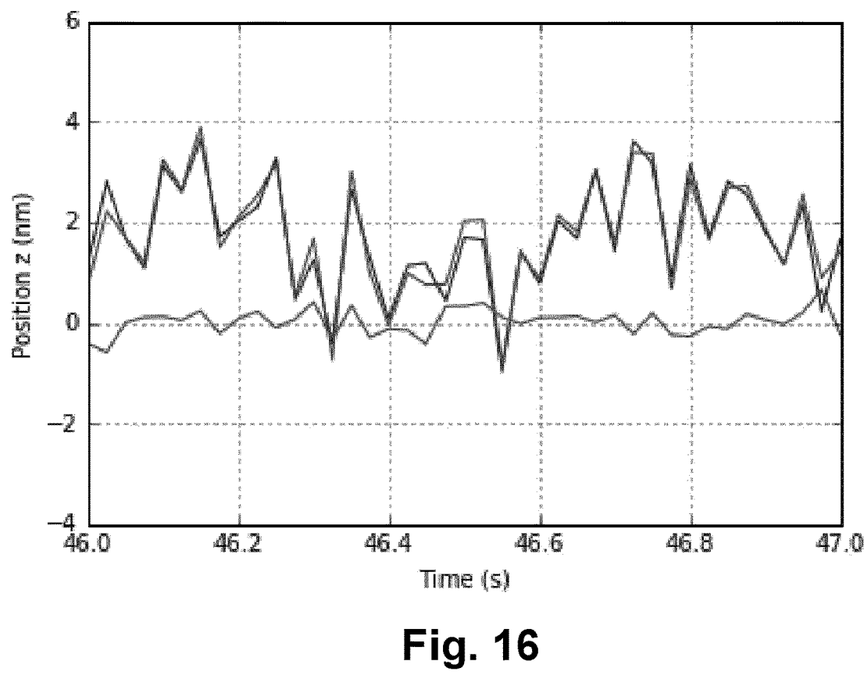
FIG. 16 illustrates the measurement of components of the position of beads according to the given direction over time with a system of the prior art.

FIG. 15 illustrates the various signals for one particular bead: the raw signal (a), the average of all beads (not visible), and the signal-minus-average (b). For this bead, one measures:

a standard deviation of the raw signal of 3.3 nm, which encompasses all sources of noise (thermal drift, mechanical noise, optical measurement noise)

a high-frequency standard deviation of the raw signal of 1.1 nm (filtered from low thermal drift), which comprise the contribution of the high frequency mechanical noise and of the optical noise, a standard deviation of the corrected signal (b) of 0.3 nm, which corresponds to the optical noise.

The measurement is repeated for all the different beads in the field of view.

The system comprising a 100× objective is characterized by an optical precision of 0.3 nm, and by a high-frequency mechanical noise of 1 nm.

Figure 17:
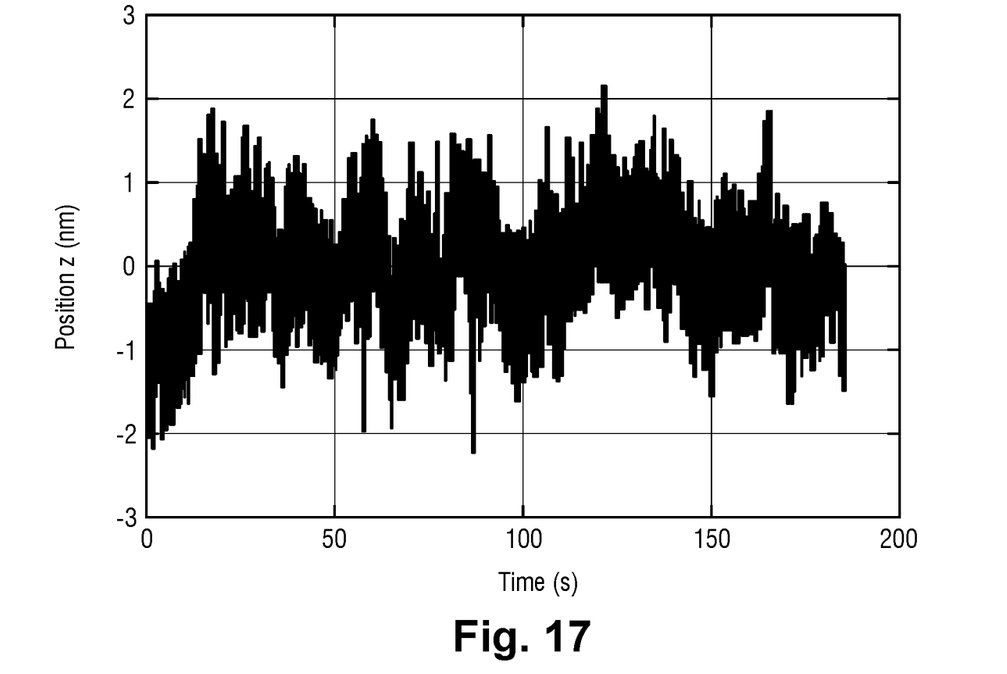
FIG. 17 illustrates the measurement of components of the position of beads according to the given direction over time with a system according to a possible embodiment of the invention.
Figure 18:
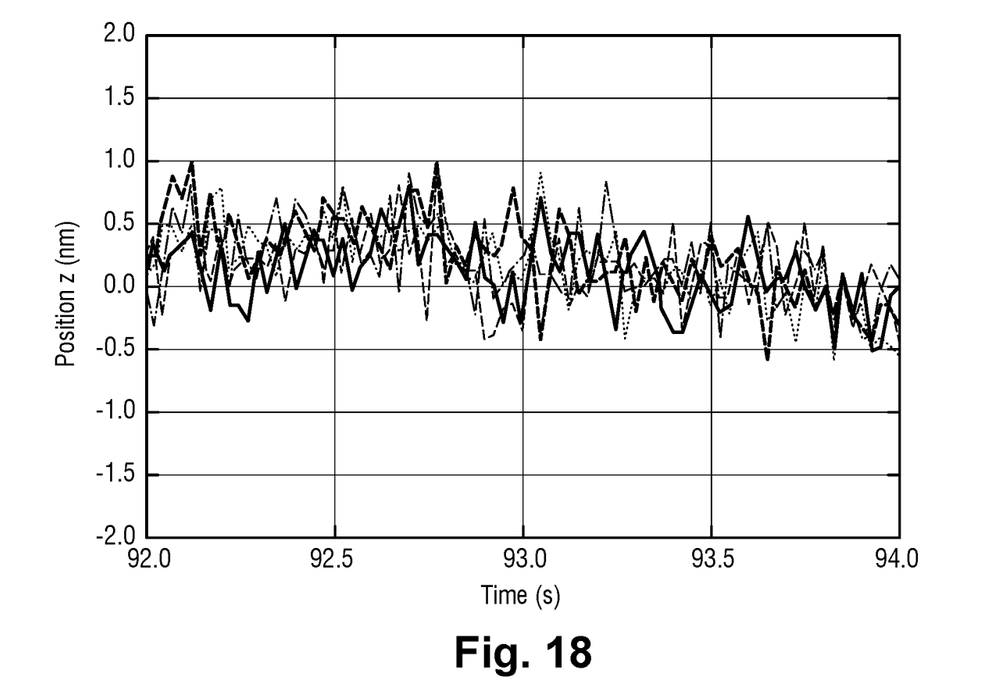
FIG. 18 illustrates a zooming view of the measurement of components of the position of beads according to the given direction over time with a system according to a possible embodiment of the invention.

In reference with FIG. 17 and FIG. 18, the same experiment (recording the position of fixed beads, with the same camera, settings, and the same average intensity of the LEDs) has been repeated except that the piezoelectric device is replaced with the device 1, while keeping the objective and the optical mask unchanged. The system also comprises the thermalization described above.

FIG. 17 illustrates the record of the position in the z-direction (given direction 2) of immobile beads. By virtue of the active thermalization of the system, very little (low frequency) thermal drift is seen during the course of the experiment.

For this bead, one measures:

a standard deviation for the raw signal of 0.5 nm, which comprises all the instrument noise, including the low frequency noise (residual thermal noise), a high-frequency standard deviation for the raw signal of 0.3 nm, and a standard deviation of 0.3 nm for the correct signal.

The fact that no difference in noise can be seen between the raw high frequency fluctuation and the standard deviation of the corrected signal indicates that the mechanical noise from the focusing system has been sufficiently reduced to be negligible compared to other source of noises (residual of thermal noise and optical noise). The same process achieved for all beads gives the same result.

The invention claimed is:

1. A device for positioning an object according to a given direction, comprising:
    a frame,
    a holder for holding the object, the holder being movable relative to the frame according to the given direction,
    a main lever extending from a first point to a second point, said main lever being rotatably mounted to the frame via a first pivot link connecting the main lever and the frame at the first point of the main lever,
    the main lever being connected to the holder at a third point via a second pivot link, the third point being arranged between the first point and the second point, so that a displacement of the second point of the main lever relative to the frame according to the given direction causes displacement of the holder in said direction, said displacement of the holder having a smaller amplitude than an amplitude of the displacement of the second point,
    the device comprising a secondary lever connected to the holder via a third pivot link, the secondary lever being connected to the main lever via a fourth pivot link, and being rotatably mounted to the frame via a fifth pivot link, the third pivot link being arranged between the fourth pivot link and the fifth pivot link.

2. The device according to claim 1, wherein the first pivot link and/or the second pivot link is (are) a torsion spring(s).

3. The device according to claim 1, made of one single piece of material, the material being notably chosen between a metal and a polymer.

4. The device according to claim 3, wherein the first pivot link and/or the second pivot link is a narrowing of the material relative to the main lever.

5. The device according to claim 3, wherein the single piece of material is a material having an ultimate tensile strength over 100 MPa.

6. The device according to claim 1, further comprising a movable part connected to the main lever(s) at the second point, the movable part being adapted to be displaced in the given direction by an actuator.

7. The device according to claim 1, wherein the main lever is a first main lever, the device further comprising a second main lever, the first main lever and the second main lever being arranged on two opposite sides of the holder.

8. The device according to claim 7, wherein the second main lever extends from a first point to a second point, the device further comprising a movable part connected:
    to the first main lever at the second point of the first main lever, and
    to the second main lever at the second point of the second main lever,
    the movable part being adapted to be displaced in the given direction by an actuator.

9. An assembly comprising the device according to claim 7, and further comprising an actuator configured for moving the second point of the first main lever and the second point of the second main lever at least in said given direction.

10. The assembly according to claim 9, wherein the actuator is a motorized screw having a tip, the tip being arranged in contact with the movable part so that an actuation of the screw leads to a displacement of the second point of the first main lever and of the second point of the second main lever in the given direction.

11. The device according to claim 1, wherein the secondary lever is a first secondary lever, the device further comprising a second secondary lever, wherein the first secondary lever and the second secondary lever are arranged on two opposite sides of the holder, each of the first secondary lever and of the second secondary lever being arranged symmetrically on either side of the holder.

12. An assembly comprising the device according to claim 1, and further comprising an actuator configured for moving the second point at least in said given direction.

13. The assembly according to claim 12, wherein the actuator is a motorized screw having a tip, the tip being arranged in contact with the movable part so that an actuation of the screw leads to a displacement of the second point in the given direction.

14. The assembly according to claim 12, wherein the actuator comprises a first part fixed to the frame and a second part, the second part being mobile relative to the first part, and wherein the device further comprises a magnet attached to the second part, and a magnetic field sensor adapted to detect the variation of the magnetic field caused by a movement of the second part.

15. A system comprising the assembly according to claim 14 further comprising a microscope objective, the objective being held by the holder.

16. A use of the assembly according to claim 12 to focus an optical objective, comprising moving the main lever in rotation about the first pivot link.

17. A system comprising the device according to claim 1 further comprising a microscope objective, the objective being held by the holder.

18. A use of the system according to claim 17 to focus an optical objective, comprising moving the main lever in rotation about the first pivot link.

19. A use of the device according to claim 1 to focus an optical objective, comprising moving the main lever in rotation about the first pivot link.

\* \* \* \* \*